United States Patent [19]
Segura Salvador et al.

[11] Patent Number: 5,820,069
[45] Date of Patent: Oct. 13, 1998

[54] EXPANDING CONE FOR SECURING REELS

[75] Inventors: Silvia-Belen Segura Salvador; Maria del Mar Segura Salvador, both of Almeria-Almeria, Spain

[73] Assignee: Conos Segura Palenzuela S.L., Almeria, Spain

[21] Appl. No.: 906,942

[22] Filed: Aug. 6, 1997

[30] Foreign Application Priority Data

Aug. 6, 1996 [ES] Spain ................................. 9601752

[51] Int. Cl.⁶ .......................... B65H 75/24; B23B 5/22
[52] U.S. Cl. ............................ 242/571.3; 242/573.1; 279/2.11
[58] Field of Search ........................... 242/571.3, 572, 242/573, 573.1, 573.3, 573.4; 269/48.3, 48.4; 279/2.04, 2.11, 2.12; 492/21

[56] References Cited

U.S. PATENT DOCUMENTS

| | | | |
|---|---|---|---|
| 3,048,416 | 8/1962 | Rogers | 242/573 |
| 3,881,666 | 5/1975 | Greenhalgh | 242/573 |
| 4,149,682 | 4/1979 | Gustafson et al. | 242/571.3 |
| 4,284,251 | 8/1981 | Castillo | 279/2.11 |

Primary Examiner—John P. Darling
Attorney, Agent, or Firm—Ostrolenk, Faber, Gerb & Soffen, LLP

[57] ABSTRACT

An expanding cone for securing to a reel includes an inner funnel shaped core with a wide end at a base attachable to a support shaft and tapering outwardly from the base. An enclosing body around the core having a plurality of windows. A respective blade at the core below each window and movable outwardly through the window to engage the interior of the mandrel upon the enclosing body moving toward the base of the core. A spring normally biasing the enclosing body off the core away from the base of the core. A pawl pivotally supported to the core engaging the collar of the enclosing body for preventing the enclosing body from being urged toward the base of the core by the installed mandrel. A lever movable to lift the pawl off the collar as the mandrel is installed on the enclosing body until the collar is free to be moved toward the base of the core. Upon sufficient movement of the enclosing body toward the base of the core, the blades passing through the windows in the enclosing body into engagement with the interior of the mandrel.

8 Claims, 2 Drawing Sheets

EXPANDING CONE FOR SECURING REELS

BACKGROUND OF THE INVENTION

The present invention relates to an expanding cone of the type which is used for gripping the mandrel of a reel during operations when the reel is wound and unwound, wherein the mandrel has been substantially improved in order to enhance its functioning and efficiency.

In winding and unwinding operations, two cones are placed in a coaxial and counterposed arrangement on the ends of the mandrel or tubular shaft of the reel. From initial positions in which the cones are spaced apart by a distance greater than the axial dimension of the mandrel, subsequent approach by one cone toward the other causes the cones to penetrate inside the mandrel and consequently couples the mandrel to the rotary shaft of the machine. That shaft may be attached to one or both of the cones.

Because the reel often has to be self propelling and, more specifically, subject to rotary movement which is perfectly synchronized with other components of the machine, firm connection between the mandrel and the end cones is necessary in order to prevent relative angular imbalances between these elements. To this end, each cone generally comprises a core having an outwardly facing base for gripping the support shaft. The core has a frustoconical configuration. There is also mounted on the core a possibly axially displaceable enclosing body or cone including a front sector of marked frustoconical configuration to facilitate its penetration inside the mandrel. The enclosing body also has a cylindrical sector which is equipped with grooves extending in the direction of its generatrices. Blades for locking on or against the inner wall of the mandrel into which the core is inserted are able to emerge radially through the grooves. The cylindrical sector is finished off by a peripheral collar on which the open end of the mandrel has to act by pressing the collar outwardly toward the base of the cone. This causes axial displacement of the enclosing body with respect to the core and acts against the tension of an inner expansion spring which spring connects the enclosing body and the core and causes relative axial displacement between the enclosing body and the core. Trapezoidal configuration of the blades and an oblique support defined for the blades by the frustoconical sector of the core causes the blades to project outward through the grooves, locking onto the inner wall of the mandrel and, consequently, completely securing the reel.

However, this type of expanding cone causes problems which center essentially around two aspects:

On the one hand, during coupling of a cone to the mandrel of the reel, these two elements are sometimes off center. This could cause premature engagement between the mandrel and the enclosing body and could cause the enclosing body of the cone to retract before the mandrel has abutted against the outer peripheral collar of the enclosing body. This may cause the blades to emerge radially outside the enclosing body before the blades have been accommodated inside the mandrel. This could cause considerable damage to the mandrel upon subsequent final axial coupling. An attempt to solve this problem in practice comprises beveling the front vertex of the blades in order to facilitate their penetration inside the mandrel. But this solution is inadequate.

On the other hand, after a reel has been wound or unwound and when the reel is removed, earlier locking of the blades on the inner wall of the mandrel of the reel makes subsequent unlocking difficult. There is a high risk that, during removal of the reel, the reel may be subject to unwanted axial displacements. To solve this problem, pneumatic cylinders act on one or on both ends of the mandrel during separating of the cones. This is a structurally complex solution, involving high investment costs and considerable maintenance costs.

SUMMARY OF THE INVENTION

The expanding cone for gripping reels of the invention solves the aforesaid problems.

The cone has a conventional structure including a base for gripping upon the corresponding support shaft and an enclosing body mounted for possible axial displacement over the core against the tension of an expansion spring in order to enable radial expulsion of a set of blades.

That core also incorporates, according to the invention, a pawl mounted for rocking inside a lateral recess in the core. The pawl is articulated to the core at the front end of the pawl. A protuberance, which can be retracted against the tension of a spring, is positioned inside the core to be biased radially outwardly. This rocks the pawl outwardly. The pawl thereby locks on the collar of the enclosing body on which the mandrel of the reel acts preventing the base and the core from being pushed by the mandrel. A lever located close to the collar and radially outward of the pawl is mounted to also rock radially inward and engage the pawl. The lever is actuated by the mandrel of the reel at the end of the penetrating movement of the cone inside the mandrel. The lever is pushed radially inward by the mandrel which, in turn, causes the pawl to retract radially and toward an inoperative position, in which the collar of the enclosing element is freed to be displaced toward the base. This secures the cone to the support shaft. Consequently, the collar along with the mandrel are displaced axially over the core. This causes radial expulsion of the blades which can occur only when the cone has suitably penetrated inside the mandrel of the reel.

In accordance with another feature of the invention, the collar, which finishes off the rear of the enclosing body, also has a plurality of axial orifices which are distributed in an equiangular manner around the collar. Retractable stops pass through the orifices. These are suitably fastened to the base for securing the core to the support shaft. Each stop comprises two telescopic cylinders which tend to expand axially by means of an inner spring which contracts elastically when the cones approach each other, when the ends of the mandrel of the reel act on the front of the cones. As a result, when the winding or unwinding operations are completed and when the maneuver for uncoupling the reel commences, these retractable stops tend to promote the uncoupling maneuver.

Other features and advantages of the present invention will become apparent from the following description of the invention which refers to the accompanying drawings.

DETAILED DESCRIPTION OF THE INVENTION

Figure 2:
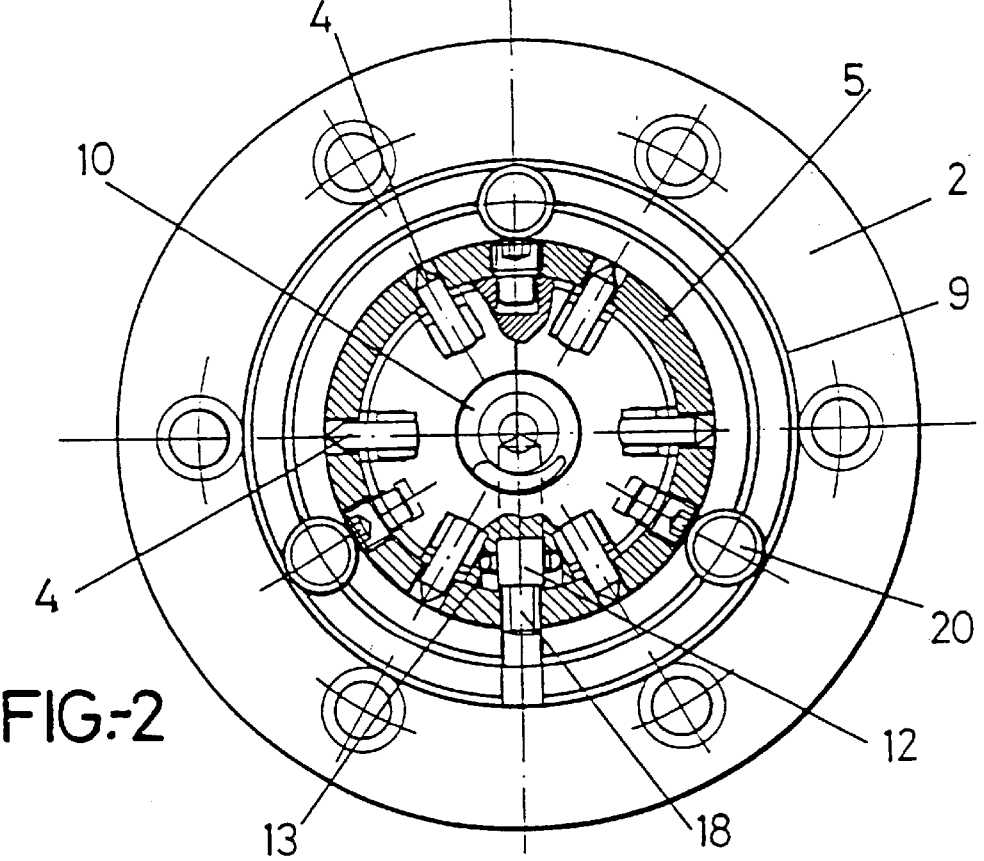
FIG. 2 is a transverse section of the cone along the sectional line A–B of FIG. 1.
Figure 3:
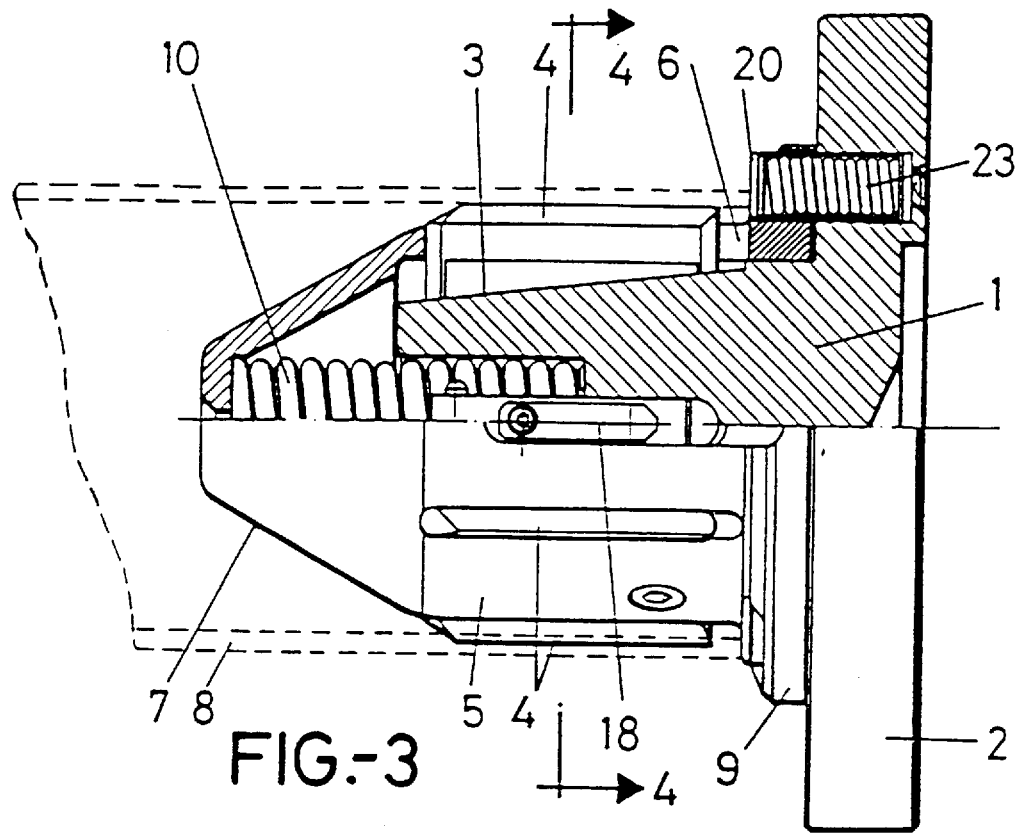
FIG. 3 shows a lateral elevation and quarter section of the cone in FIG. 1, which is similar to FIG. 1, but in which the cone appears turned through 90° and is in the working position.
Figure 4:
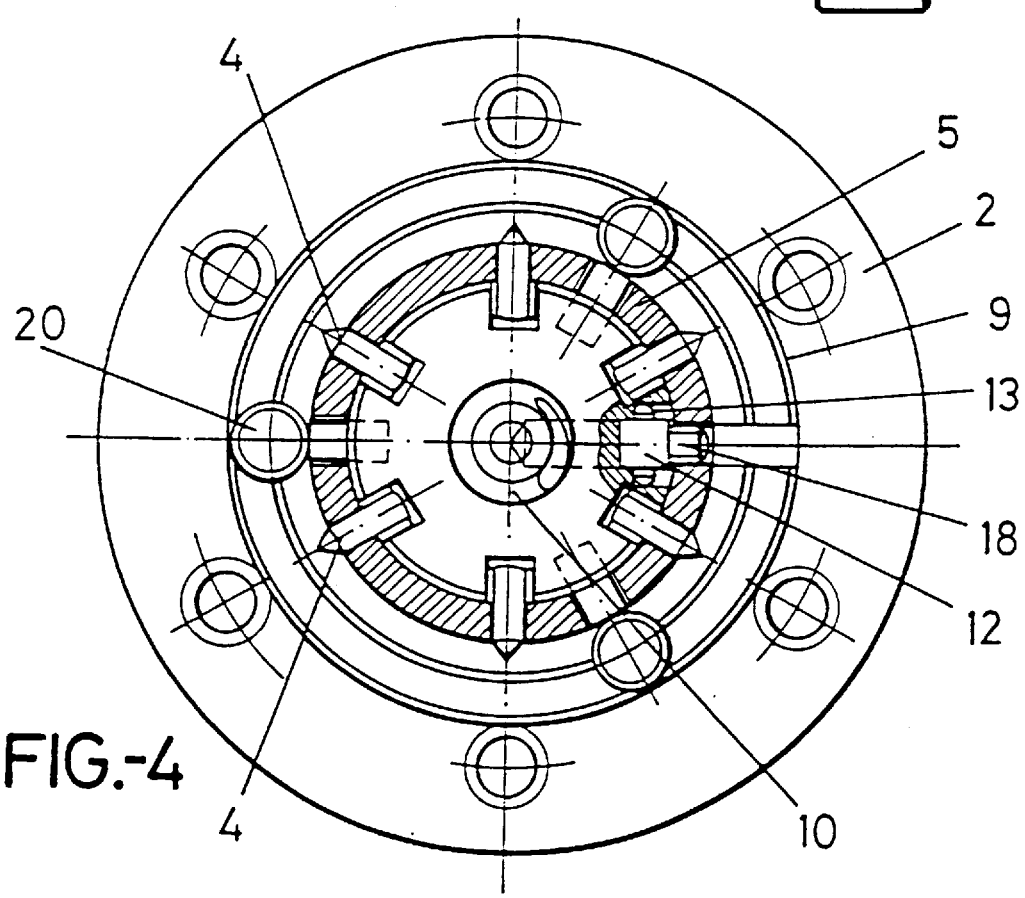
FIG. 4 is a transverse section of the cone along the sectional line C–D of FIG. 3.

The expanding cone of the invention, like a conventional cone of this type, comprises a core 1 comprising a base 2 for being secured to a support shaft (not shown). A core 3 of generally frustoconical configuration extends from the base. The core 3 defines a radial projection ramp for an annular array of blades. In the rest position of the cone, the blades are held retracted inside an enclosing part 5. The part 5 has a plurality of grooves or windows 6 which, in their number and positions, coincide with the blades 4. The windows 6 are formed in a cylindrical sector of the enclosing part 5. The part 5 is finished off by a front, markedly frustoconical sector 7 which promotes penetration of the enclosing part inside the mandrel 8, which is shown in broken lines in FIG. 3. At its other end, the enclosing part 5 is finished off by a peripheral collar 9 against which the actual mandrel 8 acts when the cones approach each other for fastening the reel. The enclosing part 5 including its pressed upon collar 9 retracts axially against the base 2, as shown in a comparison of FIGS. 2 and 3. This secures the core 1 against the tension of an expansion spring 10 which is positioned axially between the front of the frustoconical sector 7 of the enclosing part and the front of the core 1. This relative axial displacement causes the blades 4 to emerge outside, from the inoperative position shown in FIG. 1 to the operating position in which they are locked on the inner wall of the mandrel 8, as shown in FIG. 3.

Figure 1:
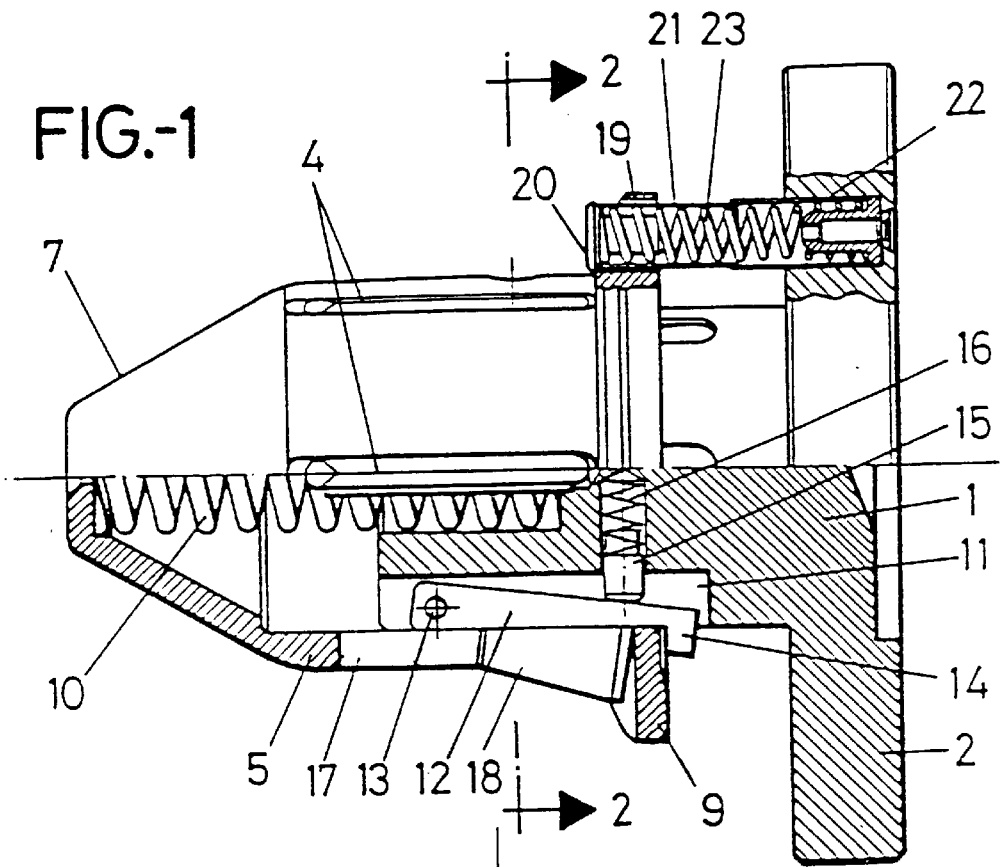
FIG. 1 shows a lateral elevation and quarter section of an expanding cone of the invention for securing reels, the cone appearing in the rest position.

In the frustoconical sector 3 of the core 1, specifically between a pair of blades 4, there is a recess 11 which, in the rest position shown in FIG. 1, extends substantially rearward beyond the rear of the collar 9 of the enclosing part 5. A pawl 12 moves inside the recess 11 and rocks on a transverse pin 13 that is positioned at the front end of the pawl away from the collar 9. The bent off free end or actual pawl 14 is radially inward of and is movable radially outward to be capable of immobilizing the collar 9 in the position of rest of the cone through the action of a radially movable, internal protuberance 15, which can be retracted against the tension of a spring 16.

In addition, the enclosing part 5 has a window 17 in which there is a lever 18 which is associated with the actual pawl 12 and is at least in part radially outward of the pawl. The mandrel 8 of the reel acts on the lever 18 during coupling of the cone inside the mandrel. As a result, the lever 18 is acted upon only at the end stage of the coupling of the cone to the mandrel. Also, movement of the lever 18 in turn engages and causes inward rocking of the pawl 12 in order to release the collar 9 so that it may be displaced by the mandrel 8 toward the base 2 for securing the core 1 to the support shaft of the cone. This also propels the blades 4 radially outward and therefore locks them onto the inner wall of the mandrel 8, as may be seen in FIG. 3.

Optionally, the collar 9 has a series of orifices 19, three being provided in the practical embodiment shown although their number may vary without affecting the essential nature of the invention. The orifices are, in any case, distributed in an equiangular manner. Each has an individual retractable stop 20 passing through it. Each stop is comprised of two cylinders 21 and 22 mounted telescopically. The actual stop 20 is fixed to the cylinder 21 and the second cylinder 22 is suitably fastened to the base 2. This secures the cone overall to the support shaft. Both cylinders 21 and 22 are also connected via a robust lower spring 23 which tends to relax the assembly axially. Therefore the actual stop 20 is retracted toward the base 2 for securing to the support shaft by the mandrel 8 when the reel is suitably coupled. This tends substantially to promote commencement of unlocking during removal of the reel.

The materials, form, size and arrangement of the elements may be varied provided this does not detract from the essential nature of the invention.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. An expanding cone for being secured to the end of a mandrel of a reel, the cone comprising:

a generally conically shaped core having a wider end including a base thereat mountable to a support shaft;

an enclosing body enclosing the core and retractable toward the base of the core; the enclosing body including a collar engageable by the end of the mandrel pushed over the enclosing body in the direction toward the base of the core; a plurality of peripheral windows spaced around the enclosing body;

a tension spring acting between the enclosing body and the core to urge the enclosing body away from the base of the core;

a respective plurality of blades disposed in the enclosing body in engagement with the conically shaped core, and each blade being located at a respective one of the windows, so that the blades may be urged outward with reference to the core and through the windows when the enclosing body is retracted against the spring over the core;

a lateral recess at a side of the core; a pawl mounted to the core to pivot with respect thereto radially inwardly and outwardly, the pawl including an outwardly bent end which extends rearwardly beyond the collar of the enclosing body for engaging the collar on the side thereof toward the base of the core, such that when the pawl engages the collar, the collar and the enclosing body are prevented from retracting toward the base of the core; urging means normally urging the pawl toward engaging the collar for preventing movement of the enclosing body;

a lever located for moving the pawl; a second window in the enclosing body through which the lever projects, the lever being so shaped and positioned that when the mandrel is moved over the enclosing body toward the collar of the enclosing body, the mandrel engages the lever, and the lever and the pawl being so placed that the lever presses the pawl against the urging means for moving the pawl off engagement with the collar, and further movement of the cone into the mandrel moves the collar of the enclosing body against the mandrel which retracts the enclosing body over the core toward the base of the core until the blades at the core are moved by the core through the windows in the enclosing body to engage the interior of the mandrel of the reel and couple the cone to the reel.

2. The expanding cone of claim 1, wherein the windows in the enclosing body are distributed in an equiangular manner around the enclosing body and the respective blades are correspondingly distributed around the enclosing body.

3. The expanding cone of claim 1, wherein the lateral recess in the core is located between a pair of the blades of the core.

4. The expanding cone of claim 1, wherein the pawl comprises a lever having one end away from the base of the core and pivotally mounted to the core and the lever has the collar engaging pawl at the other end of the lever which is toward the base of the core.

5. The expanding cone of claim 1, wherein the urging means for the pawl comprises a protruberence located inside the core and movable radially outwardly against the lever, and biasing means for moving the protruberence outward against the lever; and the lever being movable radially inwardly against the biasing means which urges the protruberence, whereby the pawl and the lever are normally biased radially outwardly and are moved inwardly against the normal bias thereon by the mandrel passing over the lever and the enclosing body.

6. The expanding cone of claim 1, wherein the collar of the enclosing body includes a plurality of orifices extending axially thereof array around the collar; an elastically retractable stop at each of the orifices, the stop also being associated with the base of the core for the stops to secure the cone to the base and to the corresponding support shaft attached to the base.

7. The expanding cone of claim 6, wherein the stop comprises a first cylinder having a free end fixed through the collar and a second cylinder which telescopes with the first cylinder and which is fixed to the base of the core; a spring between the first and second cylinders tending to extend the stop axially and biasing the collar axially so as to act on the end of the mandrel of the reel being installed over the enclosing body.

8. The expanding cone of claim 7, wherein the orifices around the collar are distributed in equiangularly therearound.

* * * * *